(12) United States Patent
Nilsson et al.

(10) Patent No.: US 8,128,849 B2
(45) Date of Patent: Mar. 6, 2012

(54) ENVIRONMENTALLY SAFE FIRE RETARDANT PROTEIN FREE COMPOSITION, A METHOD OF MANUFACTURING THEREOF

(75) Inventors: Mats Nilsson, Saltsjöbaden (SE); Truls Nilsson, Saltsjöbaden (SE)

(73) Assignee: Trulstech Group Pty Ltd, South Australia (AU)

( * ) Notice: Subject to any disclaimer, the term of this patent is extended or adjusted under 35 U.S.C. 154(b) by 230 days.

(21) Appl. No.: 12/572,830

(22) Filed: Oct. 2, 2009

(65) Prior Publication Data

US 2010/0087572 A1    Apr. 8, 2010

Related U.S. Application Data

(63) Continuation-in-part of application No. PCT/AU2008/000483, filed on Apr. 4, 2003.

(30) Foreign Application Priority Data

Apr. 4, 2007  (AU) ............................. 2007901785

(51) Int. Cl.
  *C09K 21/12* (2006.01)
  *C08K 9/10* (2006.01)
(52) U.S. Cl. ........................................ 252/601
(58) Field of Classification Search ............ 252/601
  See application file for complete search history.

(56) References Cited

U.S. PATENT DOCUMENTS

| 4,551,483 A | 11/1985 | Hicks |
| 2002/0188048 A1 | 12/2002 | Wagner et al. |
| 2006/0113513 A1 * | 6/2006 | Nilsson .................... 252/601 |

FOREIGN PATENT DOCUMENTS

GB     2234901 A  *  2/1991

* cited by examiner

*Primary Examiner* — Kelechi Egwim
(74) *Attorney, Agent, or Firm* — Renner Kenner Greive Bobak Taylor & Weber

(57) ABSTRACT

A method for producing an all-purpose harmless fire retardant protein free composition that is adaptable to be incorporated intermediate or finished products comprising by A) adding acid to a sodium hydroxide solution to form a solution with a pH in the range of 1.0 to 3.0, the acid being selected from the group consisting of mono-carboxylic acid, anhydrous di-carboxylic acid and anhydrous tri- carboxylic acid and mixtures thereof, in an acetic acid solvent, B) adding tetra-sodium-pyrophosphate and water, C) adding calcium carbonates, and once composition C becomes clumpy D) pouring composition C out onto a drying bed, E) subjecting the composition from step D to grounding, milling or grinding to achieve particles of less than 0.020 mm, F) encapsulating the particles of E with a surface coating material being selected from polysaccharide, tristearate, a wax of a polyethylene based material, and mixtures thereof.

6 Claims, No Drawings

ENVIRONMENTALLY SAFE FIRE RETARDANT PROTEIN FREE COMPOSITION, A METHOD OF MANUFACTURING THEREOF

RELATED APPLICATIONS

This application is a continuation-in-part of International Application PCT/AU2008/000483, with an international filing date of Apr. 4, 2008, claiming priority from Australia Patent Application No. AU2007901785, filed Apr. 4, 2007.

FIELD OF THE INVENTION

This invention relates to the preparation of environmentally friendly chemical reagent which may be added to polymeric materials during their production, such as the reagent provides a self fire extinguishing characteristic should the finished polymeric material or intermediate be subject to fire attack is also relates a method for producing an all purpose harmless fire retardant protein free composition that is adaptable to be incorporated into a range of differing material, of which said material forms an intermediate or finished product requiring fire retardant characteristics.

BACKGROUND ART

It is already known to the person skilled in the art that foamed polymeric materials may be created from a variety of processes including but not limited to thermo setting, thermo plastic and other similar techniques which simply involve the expansion of a particular thermo plastic polymer or at least a formation of polymers with the assistance of a blowing agent.

For example, polystyrene is a well recognised polymer derived from individual monomer units of styrene which is extracted from liquid hydrocarbon obtainable from petroleum.

The most common form of polystyrene is generally expanded polystyrene (EPS) but products from polystyrene are also made from extruded treated polystyrene of which will be further introduced below.

It is long known that in the trade that expanded polystyrene is manufactured through the introduction of a gaseous blowing agent of around about 5% into 95% polystyrene by weight, preferably pentane or carbon dioxide. With the application of heat, solid plastic is expanded into foam. Generally the heat is introduced to initialize the polymerisation through steam above 95 degrees Celsius.

Extruded polystyrene (EPS) on the other hand, is formed under high pressure and temperatures to avoid generating a gas which would bring about an expansion as is the case with EPS.

The benefits of solid foam polystyrene whether created by an extrusion or an expansion process is that what is provided for is a material having particular useful characteristics in that the voids containing trapped air provides suitability as a building material for use in structural insulation and the like. Nonetheless polystyrene and the products made there-from are characterised as being highly flammable or at least easily ignitable.

Consequently, though such products are efficient insulators at low temperatures, it is not possible for such materials to be used in any exposed installations in buildings or elsewhere. In many places, the building codes and relevant laws and regulations stipulate that polystyrene products and material must be concealed behind dry wall, sheet metal or concrete.

As the person skilled in the art would appreciate, if material made of polystyrene was placed in situations where temperatures increased, for example exposure to an open plain, these foam plastic materials would easily become accidentally ignited, bringing about extensive fire damage.

Due to the fire hazards associated with polystyrene material and the products derived there-from, another polymeric material known as polyurethane, which can also form various types of foams to form a variety of products is used in its place.

Nonetheless as will be introduced shortly below, whether it is polyurethane, polystyrene, latex, paints, glues or any other polymeric material, all such products are essential flammable and their use in general purpose applications is often not permissible because of the presented hazards that potentially can occur.

Polyurethane is made up of organic units joined by urethane links. Its uses are diverse and for polyurethane form to foam, because it can be presented in various flexible and rigid types it makes it suitable to be used with upholstery fabrics in commercial and domestic furniture, whereas the more rigid foams are applied to the insides of metal and plastic walls as one would see on fringes and the like, and applications where thermal insulation panels in a building arrangement would be required.

Still further, it is well recognised in the trade that expanding polyurethane foams, as it can be presented in a variety of forms, makes not only useful for insulation, but there are also further applications in packaging, sound deadening devices, flotation, upholstery Madding, varnishing, glues, furniture manufacturing, sealants and even electronic components.

Polyurethane products are normally manufactured by a reaction of polyisocyanante and a polyol, for example such that those having an organic structure with at least two isocyanate or alkali groups, in the presence of a blowing agent and also a catalyst will assist the rate of reaction.

It is these polyols and plastics that then form the basis of so many products of which are referred to above and are used throughout industry.

The light polystyrene derived products polyurethane, is also well known for presenting a real risk of fire hazards because of its foam-ability.

The cell structure of these foaming polymeric products, particularly those of high organic content and large surface area will decompose and burn rapidly when exposed to fire and/or high temperatures.

Once ignition of the fire has taken place the problem worsens because as the polymeric material begins to drip, it serves to spread to fire, omitting large quantities of smoke and also toxic gases that were contained within the foam material.

As the person skilled in the art would appreciate one mechanism in order to solve the problem of flammable polymeric material would be to protect the foam plastic material with some type of fire retarding arrangement.

As explained in U.S. Pat. No. 4,551,483, polymeric foams characterised for being included in products such as mattresses, upholstered furniture, building materials, vehicle installation and seating, housing interiors, electrical equipment and the like. Nonetheless when burning, it produces toxic gases.

The product is still used however because of its resilient characteristics and because it can be moulded to the shapes required. It would be however, advantageous as stated to make the foam fire retardant.

As further explained in U.S. Pat. No. 4,551,483, foam shapes are moulded by using a two part mould which when closed, form a cavity of the desired shape and into one of which are just blended polymeric material, normally comprising of polyol is blended with a catalyst, is poured and the other mould parties quickly close on the first part to form the cavity. The amount of blend is proportional to only partly filled the cavity prior to foaming.

Polymeric material foams quickly and fills the mould cavity, after which the mould is open and the moulded shape is removed.

As stated in the document methods of applying a fire retardant to such polymeric foams' shapes are ineffective. For other materials it is known that various dry fire retardant substances can be ground and incorporated with water and applied by painting, spraying and the like with some effectiveness.

Nonetheless one important problem as stated has been that such fire retardants include active components which are essential volatile so if applied to the surface of the foam, their effectiveness after drying is also short lived.

These arrangements generally have the fire retardant substances as finely powdered and blended dry directly into the polyol of the polyurethane blend prior to its foaming by blending in the catalyst, they are distributed during foaming throughout the foam as fine particles which are encapsulated by the polyurethane so as to protect them from evaporation after foaming is completed.

Protection against being worn away as is in the case of a surfactant application, is also provided. The fire retardant particles remain substantially unchanged until released by initial burning of the foam, at which time they become effective as a fire retardant.

Applying such an arrangement has been effective using fire retardants, such as ammonium phosphate, ammonium chloride, sodium bicarbonate and borax.

As the person skilled in the art has been taught such effective fire retardants blended into the polymeric material are mixed and before or after mixing are finally ground.

However, the problem with using these fire retardants which have been grounded up and powdered and incorporated into the polymeric material is that all of the fire retardants would not be considered environmentally friendly, and still further, all such fire retardant mixes described above and considered effective could not be considered harmless fire retardants as each contain protein based material.

As the person skilled in the art would appreciate, protein leads to allergic reactions potentially on the skin of users, and therefore compositions including such ingredients could not be classified as harmless.

Still further, a fire retardant that contains protein such as ammonium phosphate and urea, which as introduced above was considered an effective fire retardant following incorporation into polymeric material during the foaming stage, is that once the retardant comes in contact with water, it then re-enters environments which these proteins can be fed off leading to various environmental hazards.

Therefore there still remains a need in the relevant art to allow polymeric material such as polystyrene and polyurethane to be applied to its widespread industrial applications, without a fire hazard, this same consideration also extends to other flammable polymeric material such as rubber, varnishes, paints, glues.

However the more particular problem is not only is there a need to provide fire retardant suitability to such material, but the fire retardant characteristic to be introduced into the intermediate and then into the final product to which that material will be applied to, should be such that itself is also harmless and environmentally friendly.

In Patent Number PCT/AU03/00980 there is provided for a harmless fire retardant protein free composition. As described in Patent Number PCT/AU03/00980 the introduction of the tetra potassium pyro phosphate provided for a harmless fire retardant that had a double action when combating a fire hazard situation.

Advantageously, the composition containing tetra potassium pyro phosphate was able to absorb the heat from the article being treated for flame attack, and therefore able to cool the area around the flame, and at the same time being able to consume any free oxygen which may be fuelling the fire.

Hence the composition of the fire retardant described in Patent Number PCT/AU03/00980 had an almost dual type simultaneous action working on the fire, not only to cool the product, making it less susceptible to further ignition by fire, but also to scavenge any oxygen in the vicinity of the flame to which would fuel such a flame.

Nonetheless such a described harmless fire retardant protein free composition because of the conditions of manufacturing many polymeric materials such as polyurethane and polystyrene referred to today would be, that in the case of polystyrene, the high temperatures would destroy the aqueous conditions presented in the harmless fire retardant protein free composition thereby deactivating the ability for the fire retardant to act subsequently when called upon.

Still further, in the case of polyurethane manufacture, the actual aqueous content of the harmless fire retardant protein free composition could influence the controlling cell structure of the foams being created, as some of the composition itself becomes involved in the reaction between the polyol and the isocyanate groups.

Nonetheless the harmless fire retardant provided for in PCT/AU2003/00980 was designed for the most part to be a prophylactic surface treatment application, primarily with focus on cellulose materials and other natural organic fibre material applications.

Therefore there remains a need to come up with an improved more flexible harmless fire retardant to the one provided for in PCT/AU2003/00980 so it can be more universally applied to a wide range of products and applications.

The object of this invention is to provide a method for producing an all purpose harmless fire retardant protein free composition that is flexible enough to have the ingredients of the composition adjusted in quantity, kind and physical structure so as to have the composition adaptable to be incorporated into a range of differing material, of which material forms an intermediate or finished product requiring fire retardant characteristics.

SUMMARY OF THE INVENTION

In one embodiment of the invention there is provided a method for producing an all purpose harmless fire retardant protein free composition that is adaptable to be incorporated into a range of differing material, of which said material forms an intermediate or finished product requiring fire retardant characteristics, said method including the steps of;

A. dissolving a mono-carboxylic acid, selected from a group, consisting of at least one of, or a combination therefore, of formic acid, acetic acid, stearic acid and/or benzoic acid, and/or an anhydrous di-carboxylic acid selected from a group, consisting of at least one of or a combination therefore, of oxalic acid, malonic acid, succinic acid and/or glutaric acid, and/or an anhydrous tri-carboxylic acid, consisting of citric acid in an acetic acid solvent forming a solution with a pH in the range of 1.0 to 3.0, B. adding tetra-sodium-pyrophosphate and water to A for an endothermic process, C. adding calcium carbonates to the acidic solution B for the generation of an exothermic reaction, D. once composition C becomes clumpy the composition is poured out onto a drying bed for drying, E. the dried composition of step D is grounded, milled and/or grinded to achieve particles of less than 0.020 mm, F. encapsulate the particles of E with a surface coating material selected from a group, consisting of at least one of or a combination therefore, of polysaccharide, tristearate and/or a wax of a polyethylene based material.

G. such that the encapsulation particulate crystals are blended during the formation of the intermediate or finished polymeric material in that the encapsulation provides means for the particulate crystals to remain inactive within and when applied to the polymeric material until said polymeric material is ignited by fire.

In preference step B has water less than 40 percent weight %.

In preference the drying process of step D includes illuminating the cake with infra-red radiation.

In preference in step B the amount of tetra-sodium-pyrophosphate is in the range of 5-15 percent of the total mol amount of the carboxylic acids added.

In preference for 1 mol of the carboxylic acids that generates a basic salt there is a corresponding 2 mol of the carboxylic acids generating acid salts.

In preference for each mol of added tetra-sodium-pyrophosphate there is 2 mol of carbonates to generate carbonic acids.

In preference carbon in the form of starch is added to either composition A and/or B.

Advantageously the added starch will then be hydrolysed to monosaccharides may provide improved functionality of the fire retardant. Preferably even small additives of other food grade chemicals might be useful in some applications to improve the fire retardant functionality. For example, adding some small quantities of simple food proteins can improve the functionality reducing the required weight load and so forth.

Basically there is provided an acid salt (proton donator), volatile cat-ions (stronger bonds), non-flammable gas (swelling process), carbon source (intumescences), hydroxylics (covalent bonds), hydroxides (ionic bonds). The basic salt is required to prevent living organisms like fungus, mould and so forth degrading the composition.

Preferably a slightly increased mol amount of acetic acid added according to the composition may improve the intumescent swelling charring process, but it takes place on behalf of a less thermal energy absorption capability of the fire retardant additive.

Further a decrease of the mol amount of acetic acid according to the above steps may improve the thermal energy capability on behalf of the intumescent swelling charring process.

The most volatile alkali cat-ions reacts different depending on the an-ions. Alkali acetate dissolves easier compared with alkali—benzoate, alkali—citrate and alkali—oxalate i.e. Alkali earth metal cat-ions, like calcium, make a much stronger bond, more difficult to dissolve, compared with the alkali cat-ions of potassium or sodium and so forth.

The mix of alkali cat-ions and alkali—earth metal cat-ions give some good effects creating a complex salt with both intumescent extinguishing functionality and thermal energy absorption capability. For example, tetra-sodium-pyrophosphate supports the mixture with alkali cat-ions meanwhile calcium carbonates support the mixture with alkali—earth—metal cat-ions.

Hence as the person skilled in the art would appreciate as soon as you support the mixture with calcium cat-ions a precipitation of calcium oxalate or calcium citrate starts. The sodium cat-ions from the tetra-sodium-pyrophosphate will stay as ions until the calcium cat-ions completely have reacted with the existing an-ions, forcing the sodium cat-ions to move away to the an-ions of the weakest acid, for example the acetic an ions.

Further sodium acetate dissolves easiest of all existing salt compounds of the complex salt however the solubility in water increases dramatically with higher temperatures. Calcium acetate is next to sodium acetate the easiest to dissolve in water but in contrast to sodium acetate the solubility decreases with higher temperature. The remaining alkali carboxylates of the compositions are salts with strong internal bonds and a low solubility in water. That part of the complex salt improves the thermal energy absorption capability of the salt meanwhile the weak bond of acetate assists to start the extinguishing intumescent charring process. Nonetheless the intumescent charring process requires carbon which has to be supported both from the carboxylates as well as from the composition treated organic material in focus.

If the complex salt consists of too strong internal bonds the intumescent charring process will degenerate.

In a further form of the invention there is a method for producing an all purpose harmless fire retardant protein free composition that is adaptable to be incorporated into a range of differing material, of which said material forms an intermediate or finished product requiring fire retardant characteristics, said method including the steps of 1. dissolving a highly concentrated alkali in water to obtain a hydroxide anion aqueous solution;
2. adding a mono-carboxylic acid, selected from a group, consisting of at least one of, or a combination therefore, of formic acid, acetic acid, stearic acid and/or benzoic acid, to the hydroxide aqueous solution making an alkali salt to substantially reduce the risk of mould and deterioration of the composition in the material;
3. fully dissolving the mono-carboxylic acid with the hydroxide anions in the aqueous solution so that no free mono-carboxylic acid remains in the hydroxide anion solution;
4. adding anhydrous di-carboxylic acid selected from a group, consisting of at least one of, or a combination therefore, of oxalic acid, malonic acid, succinic acid and/or glutaric acid to the hydroxide aqueous solution such that the added anhydrous citric acid completely combines with the remaining free hydroxide anions;
5. adding anhydrous tri-carboxylic acid, consisting of citric acid to the hydroxide aqueous solution such that the added anhydrous citric acid completely combines with the remaining free hydroxide anions;

citric;

6. adding carbon to the solution provided from step E in the form of starch;
7. adding a carbonate based metal salt or compound to the solution;
8. adding an anhydrous pyrophosphate selected from a group, consisting of at least one of or a combination therefore, of sodium pyrophosphate, disodium salt, calcium pyrophosphate and/or zinc pyrophosphate to the solution;
9. crystallise the solution to form compact crystals using a drying means;
10. ground the compact crystals so that said crystals become rounded;

11. sieve and separate from the grinded crystals particulate crystals of less than 0.020 mm;
12. encapsulate the particulate crystals of less than 0.020 mm such that the encapsulation provides means for the composition to remain inactive within and when applied to the material until said material is ignited by fire.

An advantage of such an arrangement is that this improved method to produce a harmless fire retardant protein free composition made under this method, has the composition dried to reduce its water content so as to provide a grounded crystallised or powdered form. Advantageously rather than exposing this grounded compact crystallised form and trying to blend it directly into the material that requires fire retardant characteristics, the crystals are protected with an encapsulated covering, so as to protect the crystal from inadvertently reacting and losing their effectiveness.

As the compact grounded crystals are encapsulated should it be exposed to high temperatures during application and integration with the material it is formulated to protect, such as during a polymerising process, the composition will suffer no degradation or attack.

If the simple water based composition provided for in PCT/AU2003/00980 was applied to a material at fairly extreme conditions, which one would expect during polymerisation, there would be complete degradation of the fire retardant protection characteristics of the composition. Nonetheless with the method of this invention which includes encapsulation to the compact crystals this protects the fire retardant until such time it needs to be released by the initial burning of the material so it can become effective as a fire retardant.

Accordingly the composition will be encapsulated by a material depending on the application to which the compact grounded crystals must be applied to.

For example, a surface penetration treatment requires a transparent aqueous solution whereas polymerisation of the composition with ABS, EPDM rubber, PVC plasticizers requires an encapsulated wax product, which is able to withstand high temperatures.

To be able to integrate the natural harmless fire retardant composition with foodstuff packaging that uses for example, expanded polystyrene the type of encapsulating material required has to be an inorganic chemical compound to withstand a contact with styrene-monomer under the polymerisation process.

In preference the highly concentrated alkali is a hydroxide.

In preference the alkali hydroxide reacts completely with the added anhydrous carboxylic acid and the driven chemical reaction between the two will drive the mixture to become an acidic solution.

In preference the result of the solubility of anhydrous carboxylic acid in the alkali hydroxide aqueous solution is dependent on the pH of the alkali hydroxide.

In preference the solution with the combined anhydrous carboxylic acid and the alkali hydroxide with all of the hydroxide combined provides a pH of about 4 for the solution:

An advantage of such an arrangement is that this improved upon harmless fire retardant protein free composition has been dried to reduce its water content so as to provide a powdered form.

However rather than exposing this powdered form and trying to blend it directly into the polymeric material that has been formed, advantageously and with considerable inventive concept, a wax is applied to encapsulate this powdered form of the harmless fire retardant protein free composition.

As the wax encapsulates the powdered composition as a melting temperature above 95 degrees, should it be exposed to high temperatures during the process of polymerising of foaming products such as polystyrene, the wax will suffer no degradation or attack, thereby exposing the composition.

In preference, the water is reduced from the harmless fire retardant protein free composition for approximately 70% down to 1%.

In preference, the method in applying or having the harmless fire retardant protein free composition dried would include having a slurry of the composition exposed to a cyclone or vortex type blowing action whereby tubulised air is introduced in a confined environment such that the powder would then be allowed by friction with air roll around in a drum to provide grounded particulates.

Preferably these particulates could be rounded and then sieved or at least grounded to a dimension of 1 to 20 micro metres.

In preference the particulate is then cooled by blowing air into a confined spacing to which the particulate matter is free to be disbursed therein.

Advantageously as the person skilled in the art will appreciate that now it is possible to provide an effective fire retardant into material which is polymerised to form various moulds of foam material and other uses, such that the overall rating of such products can still be described as environmental friendly.

Advantageously with this form of the invention, rather than introducing fire retardants into polymeric material, of which said fire retardant is itself toxic, such practice is avoided through the replacement with a harmless fire retardant protein free composition, of which is suitable for introduction into polymeric material at fairly extreme conditions without degradation of the fire retardant protection characteristics, because said fire retardant has been encapsulated within a type of a coating material to protect the fire retardant until such time it needs to be released by the initial burning of the material so it can become effective as a fire retardant.

In preference the coating material is selected from a group, consisting of at least one of, or a combination therefore, of polysaccharide, tristearate and/or a wax of a polyethylene based material, preferably Lotus Flower derived.

In preference the harmless fire retardant protein free composition when applied to polystyrene polymeric material would preferably select the alkali metal salt or compound including at least one of, or a combination therefore, of lithium, sodium, potassium, magnesium and/or calcium.

Advantageously the selection of the lithium alkali metal is the leased non-hydroscopic among the available alkali metals. As the person skilled in the art will appreciate, there is a requirement to coat the powder to be used as a fire retardant additive integrated into other materials in industrial manufacturing processes using steamed water while at the same time it is also required to minimise the surface coating as it is represented as an inflammable material which will be added to the produce.

Therefore practical tests show that the importance of balance in the coating to be around 5% in weight to the powder to be able to withstand the steamed water, heat treatment during the polymerisation process for the foaming product such as expanded polystyrene.

Still further, regarding non foaming polystyrene products, chemical compounds, also equally requires using similar non hydroscopic fire retardant additive products to avoid generating heat from the fire retardant additive powder during the polystyrene material manufacturing process.

As the production of solid polystyrene material often is formed under high pressure and temperature it is required to have the compound consisting of a very dry fire retardant additive powder similar to the one mentioned above to avoid generating of gas during the industrial polystyrene material manufacturing process.

In acrylonitrile butadiene styrene plastics there is a requirement to mix the fire retardant additive with clay being compounded together with the ABS before moulding.

Still further as the person skilled in the art will appreciate from reading this specification polyurethane products would put similar demands on the fire retardant additive even though it is not necessarily exposed to high steamed water contact.

This may reduce some of the demands for coating the powder however polyurethane foams and the chemical reaction between the fire retardant additive and the mixture of polyols and isocyanates may require the fire retardant additive to be mixed into either the polyols or isocyantes without reaction. It is first when you mix polyols with isocyantes that the fire retardant additive chemically react. The fire retardant additive powder is then stable over time in the polyurethane foam being part of the material which supplied into industry.

When EPDM rubber material is utilised there is mixing of the fire retardant additive direct into the mineral oil used in the process obtaining the required final product. In many number of material applications requiring fire retardant additives, an emulsion of the fire retardant additive is preferred, for example in paints, glues and in latex and the like.

As the person skilled in the art will appreciate, the fire retardant additive in many cases requires another material carrier to integrate into the other materials successfully, of which would depend on the material to which the fire retardant additive would need to be incorporated therein to.

A fire retardant polyurethane or polystyrene foam containing a harmless fire retardant protein free composition encapsulated within a surface coating compound having been formed into dry particles such that the particles being encapsulated within the polyurethane or polystyrene foam are so protective from interaction with the polymeric material and to expose to fire by burning of the foam, the particles being substantially uniformally distributed throughout the foam and comprising substantially uniformally inter-mixed particles of dimensions between 0.5-5 micro millimetres.

Still further there is also a method for making a harmless fire retardant protein free composition polyurethane or polystyrene foam, comprising substantially uniformally blending a dry powder of the fire retardant encapsulated in a surface coating material into a polyol in the case of the polyurethane, and blending isocyanate into the polyol so as to cause foaming and produce the polyurethane foam, the fire retardant producing the fire retardant gas when exposed to fire and being unstable when exposed to air with time, the particles having the size causing them to be encapsulated by the polyurethane of the foam.

To assist in an understanding of certain features of this invention an Example 1 is included that details the preferred method and preferred formulation of the composition.

DETAILED DESCRIPTION OF THE INVENTION

EXAMPLE 1

The method for producing an all purpose harmless fire retardant protein free composition that is adaptable to be incorporated into a range of differing material, of which said material forms an intermediate or finished product requiring fire retardant characteristics, said method including the steps.

Step 1

Dissolve NaOH (s) (purity>86%) in de-ionized water to get a Sodium hydroxide aqueous solution even though water is generated during the reaction. The exothermic reaction will evaporate water which has to be considered when calculating the required amount of added water to the mixture.

Step 2

Add Acetic acid (Purity>96%) to the Sodium hydroxide aqueous solution. The main reason to add Acetic acid to the mixture is to get an alkali salt. The alkali salt improves the insulation of the char generated by the intumiscent charring process. The alkali salt also reduces the risk in future of mould and rotting processes when applied the material.

However excess Acetic acid is not required to reduce the mentioned risk.

Further, it is important to reduce the added amount of Acetic acid to a minimum due to the high solubility of acetate in water with a risk of generating a slight acetic odour to a treated material.

To ensure no future risk of mould and rotting processes when applied the material less than 1.5% in weight of Benzoic acid is added to the Sodium hydroxide aqueous solution.

Step 3

Add anhydrous Benzoic acid to the Sodium hydroxide aqueous solution. As the anhydrous Benzoic acid consists of flakes it is recommended to grind the flakes to small particles before adding it to the solution.

It also is important to get all added alkali acid to chemically react to become alkali salts. Due to the fact that carboxylic acids are weak acids compared to the alkali hydroxides it is recommended to primarily dilute the alkali hydroxide with de-ionized water before adding the carboxylic acids. Further it is recommended to start adding the weakest of the carboxylic acids generating alkali salts, it makes it possible to get a neutral salt as well as an acid salt by the stronger acids of the weak carboxylic acids.

It is important to get a complex salt consisting of both alkali salt as well as an acid salt to generate a good chemical balance achieving an excellent flame retardant functionality.

Due to the known difficult to dissolve alkali hydroxide completely it is recommended to add several types of carboxylic acids one-by-one, letting each one completely dissolve in the solution, until an acidic solution with a pH below 4 is achieved.

Step 4

Add anhydrous Citric acid to the Sodium hydroxide aqueous solution to let the rest of the Sodium hydroxide left in the aqueous solution react completely with the added anhydrous Citric acid. The chemical reaction will drive the mixture to become an acidic solution with a of about 4.

The solubility of Citric acid in the Sodium hydroxide aqueous solution is good. The amount of citrate achieved at this point depends on the mol amount of the added Sodium hydroxide.

The above chemical process generates water, but also thermal energy (heat).

It takes more time to dissolve the Citric acid accurately in Sodium hydroxide aqueous solution compared to Acetic acid, but goes quicker compared to Benzoic acid.

The applicant has found laboratory experiments suggest to initially adding more water to compensate for the evaporation of water under the exothermic processes. The chemicals in use often dissolve better at a temperature above +40° C. Otherwise a reduced temperature of the anhydrous Citric acid to about +4° C. reduce the evaporation of water quite good still easy to dissolve by the Sodium hydroxide.

Step 5

Add anhydrous Oxalic acid to the achieved acidic aqueous solution. Oxalic acid is one of the strongest of the weak carboxylic acids in use. By adding Oxalic acid to the acidic aqueous solution a below 4 is received, but also an embryo of an acidic salt will be ensured.

Oxalic acid is less soluble compared to Citric acid and will take some time to completely dissolve in the acidic aqueous solution.

Step 6

Adding carbon to the solution in the forth of starch.

Starch is recommended to be added to the mixture to increase the amount of Carbon offering a better intumiscent charring process. But the geometries of the starch also offer other physical advantages to a material treated with the composition, especially during the melting process of a material the added starch will improve the viscosity of a material on fire making it less difficult to stop a fire.

The starch used has been treated to consist of a number of cross-links to avoid the starch to become a hinder in the chemical process. Depending on when starch is added in the process different results might be achieved. The manufacturer of the special treated starch claims the starch to be stable in a mixture with a pH below 10.

Unfortunately, it doesn't seem to be right. Adding the starch to the mixture between "step 7" and "step 8" generates a heavy foaming process speeding-up the generating of Carbon dioxide. Probably the reason for that belongs to the hydrolyse effect caused by the acidic mixture.

It is well-known that Starch can be hydrolysed into simpler carbohydrates by acids.

In that case the applicant adds starch before adding the carbonate so the foaming process might be less heavy. Still, the starch will be hydrolysed into simpler carbohydrates, even if the carbonates are added after the starch. The more hydrolysed the starch will become the better crystallization effect will be.

The amount of starch added to the mixture ought to be similar to how much pyrophosphate is added to the mixture.

Laboratory experiments show that the starch might have a reducing effect on the reaction process of PU-foam, especially in terms of slowing down cream time/rise time of the foam process.

Further, the starch in combination with the pyrophosphate seems to increase the material bonding.

In case of adding the starch after all the other chemical compounds representing a pH neutral mixture reduce the starch to only be a filler material with a risk of being non-homogenous dispersed in the mixture. Neither will it be a part of the crystals from the crystallization process, making powder.

In that case it is better to add the starch to the already made powder mixing them together to a suitable blend. However, in both cases the starch improves the fire retardant effect but at a higher temperature.

Step 7

To get the required functionality of a flame retardant offering an intumiscent charring process some important parameters have to exist. Briefly the following parameters have to exist;
acid salt, volatile cations, non-flammable gas, Carbon source and a capability to absorb thermal energy.

To get a non-flammable gas as a part of the flame retardant Carbon dioxide works well.

Carbonates added to an acidic aqueous solution generate Carbonic acid. To get enough of carbonic acid to the aqueous solution it is required to start adding the carbonates at a pH below 4.

Further carbonates are known to have an excellent fire extinguishing property.

Most composition applications require powder products but there are applications requiring composition with aqueous solutions or gel products.

Due to the broad spectrum of applications, in combination with the excellent fire extinguishing properties of carbonates, the applicant decided to add it to the mixture. Further, carbonates help to drive the acidic liquid solution towards a higher pH.

However, adding the correct type of carbonates has a direct impact on the final result of the composition. In most known applications no free alkaline metals or hydroxide ions of the composition are preferred. Due to that, it is an advantage to get a precipitation based on the carrier of the added carbonate.

In the case of polyurethane foam, the applicant has noticed the catalytic effect Sodium ions have on polyol in reaction with isocyanate which ought to depend on the high solubility of Sodium acetate in water. However, Calcium carbonate shows a different effect on said chemical reaction. Probably it depends on the difference in solubility between Calcium acetate and Sodium acetate. The solubility of Sodium acetate increases with the temperature meanwhile Calcium acetate refers to the opposite.

As Sodium ions have more energy per mass unit than Calcium ions the stronger the acid is the more it attracts Sodium ions compared to Calcium ions. Due to that Calcium acetate is generated as acetate is the weakest acid (pKa=4.76) of the carboxylic acids in use. Further, Calcium belongs to group two (alkali earth metals) in the periodic scheme meanwhile Sodium belongs to group one (alkali metals) which corresponds to another reason to the difference in reaction with polyols and isocyanates.

In the case of calcium carbonate it does not dissolve in water, but in an acidic solution it dissolves under a chemical precipitation of Carbon oxide CaO.

Step 8

To make the chemical bonding stronger, in ambition to handle higher temperatures, but also to improve the intumescent charring process pyrophosphate is added in the quantities listed below.

Pyrophosphate is known as a drying agent to keep powder free from moisture. In other words the alkali pyrophosphate binds hydrogen ions and hydroxide ions to become an alkali phosphate. Due to that adding pyrophosphate to the aqueous solution will slightly increase the pH of the aqueous solution.

It is important to note the advantage of an increased amount of pyrophosphate to guarantee no risk of free hydroxide ions in the mixture. It is obvious that hydroxide ions have a direct impact on generating cross-links in Polyurethane foams.

The use of Calcium carbonate is another advantage to reduce the risk of free alkali ions causing trimerising effects on PU-foams.

However, if the mixture still is too acidic for the purpose it is suggested to add more carbonates to react with hydrogen generating water and carbon-dioxide to achieve a neutral pH. Among the carbonates available includes Calcium carbonates, Magnesium carbonates, Sodium bicarbonates $NaHCO_3$ (baking soda) or in some cases even Sodium carbonate $Na_2CO_3$ (washing soda) especially, if no precipitation is accepted to occur.

Laboratory tests have shown that Sodium bicarbonate does not seem to be aggressive to PU-foams. On the other hand, material precipitations are no big problem in case of making powder. Calcium oxide is used in many applications as a filler material without any flammable property.

By adding a polysaccharide to the aqueous solution before drying starts a film foaming is achieved giving a thin surface coating on the particles of the complex salt a type of encapsulation is achieved. The polysaccharide protects the complex salt against water reducing the risk of getting the alkali acetate dissolved during the PU-foam process. But also the polysaccharide adds Carbon to the mixture improving the intumiscent charring process.

Step 9

Drying Methods:

The quicker the drying process is the more carbon acid stays as a part of the particles which gives a better FR-functionality.

Spray dryers offer a very quick drying method generating very small particles with a high dry substance easy to grind.

However, spray drying put demands on big batches to become cost-efficient.

Small aqueous solution batches can be sprayed with a low pressure spray gun direct on a heat wall (+150° C.) in combination with infra-red lights making a quick dry and nice small particles.

Step 10

If spray drying doesn't give required dry substance it is recommended to complement the drying by using a freeze dryer or a vacuum dryer to achieve required dry substance above 99%.

Step 11

Grinding the particles starts by freezing the particles before grinding to reduce the amount of dust generated during the grinding process.

An air-grinder makes the particles round and nicely shaped with a finish of less than 0.015 mm particle size.

A pearl mill will reduce the particle size down to 0.0005 mm (0.5 micron) in case the particles will be grinded together with a suitable liquid.

The less particle size the more efficient the powder will be in weight percentage.

All chemical reactions take place on the surface of the particles. The more surface area of the particles exposed the more chemical reactions offered.

The less of particles required to be integrated into another material the less impact on the mechanical property of the treated material the particles will have.

Step 12

Sieving process to separate less than 0.010 mm particle size such that separated product is vacuum or freeze dried to achieve substance dry level of 99.8%.

Step 13

Encapsulate the particulate crystals of less than 0.010 mm such that the encapsulation provides means for the composition to remain inactive within and when applied to the material until said material is ignited by fire.

The composition in accordance to the method as outlined above in the preferred embodiment.

The invention claimed is:

1. A method for producing an all purpose harmless fire retardant protein free composition that is adaptable to be incorporated into a range of differing material, of which said material forms an intermediate or finished product requiring fire retardant characteristics, said method including the steps of;
   A. adding acid to a sodium hydroxide solution to form a solution with a pH in the range of 1.0 to 3.0, the acid being selected from the group consisting of mono-carboxylic acid, anhydrous di-carboxylic acid and anhydrous tri-carboxylic acid and mixtures thereof, the mono-carboxylic acid being select from formic acid, acetic acid, stearic acid, benzoic acid and mixtures thereof, the anhydrous di-carboxylic acid being selected from the group consisting of oxalic acid, malonic acid, succinic acid, glutaric acid, and mixtures thereof, and the anhydrous tri-carboxylic acid consisting of citric acid,
   B. adding tetra-sodium-pyrophosphate and water to A for an endothermic process,
   C. adding calcium carbonates to the acidic solution B for the generation of an exothermic reaction,
   D. once composition C becomes clumpy, pouring composition C out onto a drying bed for drying,
   E. once the composition of step D is dried, subjecting the composition of step D to one or more of grounding, milling and grinding to achieve particles of less than 0.020 mm,
   F. encapsulating the particles of E with a surface coating material, the surface coating material being selected from the group consisting of polysaccharide, tristearate, a wax of a polyethylene based material, and mixtures thereof,
   wherein the encapsulation of step F provides means for the particles to remain inactive within the intermediate or finished product until the intermediate or finished product is ignited by fire.

2. The method of claim 1 wherein step B has water less than 40% by weight.

3. The method of claim 1 wherein step D includes illuminating the composition of step C with infra-red radiation.

4. The method of claim 2 wherein in step B, the amount of tetra-sodium-pyrophosphate is in the range of 5-15 percent of the total mol amount of the carboxylic acids added.

5. The method of claim 4 wherein for each mol of the carboxylic acids that generates a basic salt there is a corresponding 2 mol of the carboxylic acids generating acid salts.

6. The method of claim 5 wherein for each mol of added tetra-sodium-pyrophosphate there is 2 mol of carbonates to generate carbonic acids.

* * * * *